3,450,726
POLYHALOHYDRINS FROM EPOXIDIZED FATTY MATERIALS

Enrique Roberto Witt, Corpus Christi, Tex., and Sammy Carpenter, Bolckow, and Kwang Yuen Zee-Cheng, Kansas City, Mo., assignors to Celanese Corporation, New York, N.Y., a corporation of Delaware
No Drawing. Filed May 23, 1966, Ser. No. 551,906
Int. Cl. C09f 5/02; C07d 31/34
U.S. Cl. 260—408     6 Claims

ABSTRACT OF THE DISCLOSURE

Disclosed herein are methods for preparing halohydroxy fatty compounds which are useful for imparting flame resistance to plastics such as urethane polymers. For example, bromo hydroxy derivatives of higher fatty acid glycerides are prepared by epoxidizing such glycerides and then reacting them with hydrogen bromide in a non-aqueous medium.

---

This invention relates to the preparation of halohydroxy fatty materials. More particularly the present invention is directed to a method for halohydrinating epoxidized derivatives of unsaturated fatty acids.

Halohydroxy fatty compounds are generally prepared by adding hypohalous acid across the double bond of an unsaturated acid, ester, amide, alcohol, etc. In one such prior method an unsaturated fatty substance, such as oleic acid, is reacted with an excess of aqueous caustic to form a soap solution, the excess caustic being subsequently converted to sodium hypochlorite by bubbling chlorine gas through the mixture or slurry. After it is formed the hypochlorite hydrolyzes to produce hypochlorous acid and more sodium hydroxide. The hypochlorination process is at an end when the hypochlorous acid no longer adds across the double bonds of the fatty acid. Another known method of preparing halohydrins consists in contacting an olefinic compound, in particular an alkene, with an aqueous solution of hypochlorous acid.

It is an object of this invention to provide an improved process for producing halohydroxy fatty compounds without requiring the use of hypochlorous acid. Another object is to make halohydroxy derivatives of higher fatty compounds which are useful in imparting flame resistance to plastics such as urethane polymers. A more specific object is to make bromohydroxy derivatives of higher fatty acid glycerides by epoxidizing such glycerides and then reacting them with hydrogen bromide in a non-aqueous medium.

It is a further object of this invention to provide an efficient method for removing excess hydrogen halide from the resulting crude product by treating the product with a low boiling alkene oxide.

Still other objects and advantages of the invention will be apparent from the following description.

According to this invention halohydrins useful as flame retardants are produced from epoxidized oils such as those prepared from reacting peracetic acid with unsaturated fatty acid glycerides of natural origin, for example soybean oil or menhaden oil. Such epoxidized oils are then reacted with a substantially anhydrous hydrogen halide such as hydrogen bromide or hydrogen chloride in a non-aqueous medium which is inert under the reaction conditions involved. Thus valuable bromohydrins, for instance, are produced by passing anhydrous hydrogen bromide through epoxy soya oil in an inert organic solvent. Chlorohydrins can be made similarly using anhydrous hydrogen chloride.

The inert organic solvents used in carrying out the process of the invention are those boiling between about 40 and 200° C., preferably between about 40 and 150° C. Organic solvents may suitably be selected from the normally liquid halogenated hydrocarbons, ethers, ketones, aromatic hydrocarbons, alcohols, and esters. Illustrative solvents are carbon tetrachloride, chloroform, methylene chloride, diethyl ether, tetra hydrofuran, acetone, methyl ethyl ketone, benzene, methanol, ethanol, ethyl acetate, etc.

The epoxidized unsaturated glycerides, from which the halohydrins of this invention are derived, are known materials resulting from the epoxidation of substances comprising glycerides of oleic, linoleic, and linolenic acids, or more broadly of unsaturated fatty acids containing from about 12 to about 26 carbon atoms per molecule. Suitable substances of this type are naturally occurring materials such as animal, vegetable and marine fats and oils. Examples of such naturally occurring fats and oils are coconut oil, corn oil, cottonseed oil, soya bean oil, menhaden oil, tung oil, wool fat, tallow, whale oil, fish oil, peanut oil, etc.

The amount of epoxidation which determines the amount of hydrogen halide to be used is ordinarily known or can be readily determined by standard methods such as adding a known amount of HCl in solvent to a weighed oil sample, allowing to react and backtitrating the excess acid that was not tied up as chlorohydrin. However, in most cases it is desirable to use in the reaction a slight excess of the hydrogen halide, e.g. 0 to 25 molar percent of theory, and to remove any residual hydrogen halide from the reaction mixture after completion of the desired halohydrin formation. It has been found that the most effective way of removing this excess hydrogen halide is by treating the mixture with an alkene oxide as for example ethylene oxide or propylene oxide. The hydrogen halide is thus chemically added at the oxirane ring of the alkene oxide yielding a halohydrin which is subsequently stripped from the mixture. The process of the invention is carried out under conditions at which the epoxidized unsaturated glycerides being halohydrinated, the organic solvent, and the hydrogen halide are in the liquid phase. The reaction may be suitably carried out at temperatures below 100° C. and preferably between 10–50° C. The solution may contain from about 20–50 weight percent of the epoxidized unsaturated glycerides in solvent.

The halohydroxy products obtained from this invention exhibited excellent flame retardant properties when used in polyurethane compositions.

The following examples are given to illustrate the invention.

Example I

To a solution of epoxy soya oil (oxirane oxygen 7.2%, 93 g., 0.1 mole) in 100 ml. of carbon tetrachloride was introduced 42 g. anhydrous hydrogen bromide (at the rate of about 200 ml. per minute) for one hour with cooling and stirring. The reactor was sealed with a balloon. The reaction temperature was kept at 10–20°. After stirring for one additional hour, 20 g. of ethylene oxide was used to remove excess hydrogen bromide at 15–35° taking the reactor mixture to neutral. This mixture was left overnight, then the solvent, bromohydrin and excess ethylene oxide were stripped off under reduced pressure (4 mm. HgA) up to 70° for 40 minutes. An amber colored paste of bromohydrin of soybean oil was obtained in almost quantitative yield, 127 g. This compound is insoluble in water, but soluble in methanol, toluene, and carbon tetrachloride.

The analysis and properties of this product and epoxy oil are shown as follows:

TABLE

| Analysis | Hydrogen bromide adduct of epoxy soya oil Calculated [1] | Hydrogen bromide adduct of epoxy soya oil Found | Epoxy soya oil, found |
|---|---|---|---|
| Oxirane oxygen, percent | | | 7.2 |
| Bromine, percent | 25.9 | 26.5 | |
| Hydroxyl, percent | 5.5 | 5.4 | 0.37 |
| Molecular weight | 1238 | 1228 | |
| Water, percent | | 0.8 | 0.13 |
| Acid number, mg. KOH/g | | 3.8 | 2.4 |
| Saponification number | 317 | 315 | 190 |
| Iodine number | 0 | 2.3 | 3.1 |
| Viscosity, cs.: | | | |
| 100°F | | | 179.8 |
| 210°F | | 72.4 | 18.4 |

[1] Calculated based on four double bonds of the soya oil.

EXAMPLE II

A polyurethane film with the following formulation was prepared.

(A)

| | G. |
|---|---|
| The halohydrin formed according to Example I | 2.15 |
| Cellosolve acetate | 8 |
| Ethyl acetate | 9 |
| Butyl acetate | 19 |
| Toluene | 13 |
| 5% cellulose acetate butyrate solution | 13 |

(B)

| | |
|---|---|
| Mondur CB-75 [1] | 44 |

[1] Mondur CB-75 is a Mobay polyfunctional isocyanate. It is an ethyl acetate solution containing 74–76% of solid.

The materials in Group A are introduced into a 6-oz. widemouth capped bottle in the order listed with thorough shaking to obtain a solution. Then Mondur CB–75 is added into solution A. The mixture is thoroughly mixed by gently shaking the bottle for at least 10 minutes. It is then allowed to stand for about 10 more minutes until no more gas bubbles are observed to form in the "dope." This material is then cast on a dried, clear glass plate with a 0.010" opening doctor blade. The film is allowed to air dry for 20 hrs. Then the glass plate and the film are immersed in water for 3 hrs. The film is carefully removed by peeling from the plate, air dried, and is now ready for testing.

The quantity of this formulation is enough for 10 to 12 films of the size of 5" x 11". The thickness of the film after drying is about 0.005 to 0.006".

The dried urethane film was held in an inclined position (45°) and burned with a match for 2–4 seconds. No burning was noticed.

The principle, preferred embodiments, and modes of operation of the present invention have been described in the foregoing specification. However, it should be understood that the invention which is intended to be protected herein may be practiced otherwise than as described.

What is claimed is:

1. A process of preparing a halohydroxy fatty material which comprises mixing an epoxidized ester of an unsaturated fatty acid in non-aqueous medium with an excess of hydrogen halide taken from the group consisting of hydrogen bromide and hydrogen chloride, adding a sufficient amount of a low boiling alkene oxide to the reaction mixture to combine with unreacted hydrogen halide, stripping volatile components from the reaction mixture, and recovering the resulting halohydroxy fatty material.

2. A process as shown in claim 1 in which the hydrogen halide is hydrogen bromide.

3. A process as shown in claim 1 in which the hydrogen halide is hydrogen chloride.

4. A process of preparing halohydroxy fatty materials which comprises dissolving 20 to 50 weight percent of an epoxidized glyceride of an unsaturated fatty acid having 12 to 26 carbon atoms per molecule in carbon tetrachloride, mixing the resulting solution with an amount equal to 100 to 125 molar percent of theory of a hydrogen halide taken from the group consisting of hydrogen bromide and hydrogen chloride at a temperature between 10–50° C., reacting unreacted hydrogen halide in the reaction mixture with ethylene oxide, and separating the halohydroxy fatty material from the mixture by stripping off the carbon tetrachloride, halohydrin and excess ethylene oxide.

5. A process according to claim 4 wherein the epoxidized glyceride is epoxidized soya oil.

6. A process according to claim 4 wherein the epoxidized glyceride has between about 3 and 20% oxirane oxygen by weight.

References Cited

UNITED STATES PATENTS

| 2,404,503 | 7/1946 | Kharasch et al. | 260—633 |
| 3,068,255 | 12/1962 | Marcus et al. | 260—408 |

FOREIGN PATENTS

| 130,502 | 11/1959 | Russia. |

OTHER REFERENCES

Morris et al.: Chem. Abstracts, vol. 55 (1961), col. 14942.

Smith et al.: J.A.O.C.S., vol. 37 (1960), pp. 320-3.

ALEX MAZEL, *Primary Examiner*.

R. J. GALLAGHER, *Assistant Examiner*.

U.S. Cl. X.R.

260—633, 634